(12) United States Patent
Assy et al.

(10) Patent No.: US 9,999,173 B2
(45) Date of Patent: Jun. 19, 2018

(54) METHOD AND DEVICE FOR AVOIDING SEED-METERING ERRORS IN PLANTERS

(71) Applicant: José Roberto do Amaral Assy, Caldas Novas (BR)

(72) Inventors: José Roberto do Amaral Assy, Caldas Novas (BR); Alexandre Rosa Leite, São Paulo (BR); Rodrigo Tadeu de Oliveira Ladeira, São Paulo (BR); Silvio de Lacerda, São Paulo (BR); Enrico Incao, São Paulo (BR)

(73) Assignee: Jose Roberto do Amaral Assy, Caldas Novas (BR)

( * ) Notice: Subject to any disclaimer, the term of this patent is extended or adjusted under 35 U.S.C. 154(b) by 85 days.

(21) Appl. No.: 15/030,484

(22) PCT Filed: Oct. 22, 2014

(86) PCT No.: PCT/BR2014/000384
§ 371 (c)(1),
(2) Date: Apr. 19, 2016

(87) PCT Pub. No.: WO2015/058273
PCT Pub. Date: Apr. 30, 2015

(65) Prior Publication Data
US 2016/0255766 A1 Sep. 8, 2016

(30) Foreign Application Priority Data

Oct. 23, 2013 (BR) .......................... 1020130273180

(51) Int. Cl.
*G08B 1/08* (2006.01)
*A01C 7/04* (2006.01)
(Continued)

(52) U.S. Cl.
CPC .............. *A01C 7/046* (2013.01); *A01C 7/102* (2013.01); *G08B 3/00* (2013.01); *G08B 21/187* (2013.01)

(58) Field of Classification Search
CPC .......... A01C 7/105; A01C 7/046; A01C 7/20; A01C 7/127; B25B 27/143; H02K 5/165; H02K 23/66; H02K 7/20
(Continued)

(56) References Cited

U.S. PATENT DOCUMENTS 3,723,989 A * 3/1973 Fathauer ................ A01C 7/105
111/903
4,239,010 A * 12/1980 Amburn ................ A01C 7/105
111/903
(Continued)

FOREIGN PATENT DOCUMENTS

BR 8007003 A 5/1981
BR PI0803536 A2 9/2009
(Continued)

*Primary Examiner* — Eric M Blount
(74) *Attorney, Agent, or Firm* — FisherBroyles, LLP

(57) ABSTRACT

A solution for avoiding errors during the seed-metering process in planters comprises the following: autonomous electricity generation to power a monitoring system; monitoring the seed loading in a seed meter (pre-sensor); monitoring clogging of the seed meter by seeds (post-sensor); monitoring obstructions in the seed duct (post-sensor); processing the monitoring data; transmitting the processed data wirelessly to a central monitoring unit for follow-up and decision-making by an operator. A solution is provided for avoiding errors during the seed-metering process in planters, allowing the operator of the machine to be automatically alerted immediately after the error occurs, and also for permanently monitoring the quality of the planting process
(Continued)

by means of a wireless data transmission system powered by an autonomous electric unit, dispensing with external batteries and power cables.

9 Claims, 9 Drawing Sheets

(51) Int. Cl.
  *A01C 7/10* (2006.01)
  *G08B 3/00* (2006.01)
  *G08B 21/18* (2006.01)

(58) Field of Classification Search
  USPC ............ 340/539.13, 540, 604; 111/903, 177, 111/111, 200, 900
  See application file for complete search history.

(56) References Cited

U.S. PATENT DOCUMENTS

| | | | |
|---|---|---|---|
| 4,307,390 A | | 12/1981 | Steffen et al. |
| 4,333,096 A | * | 6/1982 | Jenkins .................. A01C 7/105 111/903 |
| 5,598,794 A | * | 2/1997 | Harms .................... A01C 7/102 111/177 |
| 5,621,666 A | * | 4/1997 | O'Neall ................. A01C 7/102 700/283 |
| 6,073,564 A | * | 6/2000 | Keskilohko .......... A01C 11/025 111/105 |
| 7,717,048 B2 | | 5/2010 | Peterson, Jr. et al. |
| 8,074,586 B2 | | 12/2011 | Garner et al. |
| 8,468,960 B2 | | 6/2013 | Garner et al. |
| 8,504,310 B2 | | 8/2013 | Landphair et al. |
| 8,618,465 B2 | | 12/2013 | Tevs et al. |
| 8,789,482 B2 | | 7/2014 | Garner et al. |
| 8,813,663 B2 | | 8/2014 | Garner et al. |
| 8,850,995 B2 | | 10/2014 | Garner et al. |
| 8,942,896 B2 | * | 1/2015 | Mayerle ................. A01C 7/102 111/185 |
| 2009/0090284 A1 | | 4/2009 | Peterson, Jr. et al. |
| 2010/0116974 A1 | | 5/2010 | Liu et al. |
| 2010/0192819 A1 | | 8/2010 | Garner et al. |
| 2010/0192821 A1 | | 8/2010 | Garner et al. |
| 2010/0264163 A1 | | 10/2010 | Tevs et al. |
| 2011/0035163 A1 | | 2/2011 | Landphair |
| 2011/0232554 A1 | | 9/2011 | Garner et al. |
| 2011/0303137 A1 | | 12/2011 | Tevs et al. |
| 2013/0036956 A1 | | 2/2013 | Garner et al. |
| 2013/0298810 A1 | | 11/2013 | Garner et al. |
| 2014/0290546 A1 | | 10/2014 | Garner et al. |

FOREIGN PATENT DOCUMENTS

| | | |
|---|---|---|
| BR | PI1000127 A2 | 3/2011 |
| EP | 2561744 A1 | 2/2013 |

* cited by examiner

| # | 1. GENERATION OF ELECTRIC ENERGY TO POWER THE MONITORING SYSTEM |
|---|---|
| 1 | CAPTURING THE MOTION OF THE AXIS OF THE DISK OF METER BY A DYNAMO |
| 2 | SUNLIGHT CAPTURE BY PHOTOVOLTAIC PANEL |
| 3 | TRANSFER OF ELECTRIC ENERGY GENERATED BY THE ACCUMULATOR OF VOLTAGE |
| 4 | POWERING OF THE ELECTRONIC BOARD BY VOLTAGE REGULATOR |
| | 2. MONITORING THE SEED CHARGE IN THE METERING DISK (PRE-SENSOR) |
| 5 | SENSING THE PRESENCE OF SEED ON THE METER DISK HOLE BY THE PRE-SENSOR |
| 6 | ANALOG VOLTAGE SIGNAL GENERATION ASSOCIATED WITH THE PRESENCE/ABSENCE OF SEED |
| 7 | ANALOG SIGNAL TRANSMISSION TO THE MICROPROCESSED ELECTRONICAL BOARD |
| 8 | CONVERSION OF THE ANALOG SIGNAL TO DIGITAL BY THE MICROPROCESSED ELECTRONICAL BOARD |
| | 3. MONITORING THE CLOGGING OF THE METER DISK BY SEEDS (POST-SENSOR) |
| 9 | SENSING THE PRESENCE OF SEED STUCK ON DISK BY THE POST-SENSOR |
| 10 | ANALOG VOLTAGE SIGNAL GENERATION ASSOCIATED WITH THE EXISTENCE OF ANY OBSTRUCTION |
| 11 | ANALOG SIGNAL TRANSMISSION TO THE MICROPROCESSED ELECTRONICAL BOARD |
| 12 | CONVERSION OF THE ANALOG SIGNAL TO DIGITAL BY THE MICROPROCESSED ELECTRONICAL BOARD |
| | 4. MONITORING OBSTRUCTIONS IN THE SEED DUCT (POST-SENSOR) |
| 13 | SENSING THE PRESENCE OF A BULKHEAD IN THE SEED CONDUCTOR BY THE POST-SENSOR |
| 14 | ANALOG VOLTAGE SIGNAL GENERATION ASSOCIATED WITH THE EXISTENCE OF ANY OBSTRUCTION |
| 15 | ANALOG SIGNAL TRANSMISSION TO THE MICROPROCESSED ELECTRONICAL BOARD |
| 16 | CONVERSION OF THE ANALOG SIGNAL TO DIGITAL BY THE MICROPROCESSED ELECTRONICAL BOARD |
| | 5. PROCESSING OF THE MONITORING DATA |
| 17 | RECEPTION OF DIGITAL DATA CONVERTED BY THE ELECTRONIC BOARD AND SENT TO THE PROCESSOR |
| 18 | DATA PROCESSING BY THE EMBEDDED FIRMWARE IN THE ELECTRONIC BOARD |
| 19 | GENERATION OF DATA PACKETS WITH THE EQUIPMENT MONITORING INFORMATION |
| | 6. WIRELESS TRANSMISSION OF THE PROCESSED DATA TO THE CENTRAL MONITORING UNIT |
| 20 | RECEPTION OF THE MONITORING DATA BY THE RF TRANSCEIVER |
| 21 | TRANSMISSION OF DATA VIA SPECIFIC RF FREQUENCY |
| 22 | DATA CAPTURE FOR RF RECEIVER OF THE CENTRAL MONITORING UNIT IN SPECIFIC QUEUE |
| 23 | CONSISTENCY VERIFICATION AND INTERPRETATION OF THE DATA BY THE CENTRAL MONITORING UNIT |
| 24 | SENDING ACKNOWLEDGMENT SIGNAL OR INCONSISTENCY BY THE CENTRAL MONITORING UNIT AFTER CHECKING OF THE DATA CONSISTENCY |
| 25 | RECEPTION OF ACKNOWLEDGMENT SIGNAL OR INCONSISTENCY OF DATA SENT BY CENTRAL MONITORING UNIT |
| 26 | RESENDING OF DATA BY THE EQUIPMENT IN THE CASE OF NON-ACKNOWLEDGEMENT |
| 27 | AFTER 15 ATTEMPTS FOR RESEND, THE EQUIPMENT INTERPRETS THAT THE CENTRAL MONITORING UNIT IS OFF |
| 28 | A PRESENTATION OF UPDATED INFORMATION TO THE OPERATOR VIA GRAPHICAL USER INTERFACE (GUI) OF THE CENTRAL MONITORING UNIT |

Fig. 1

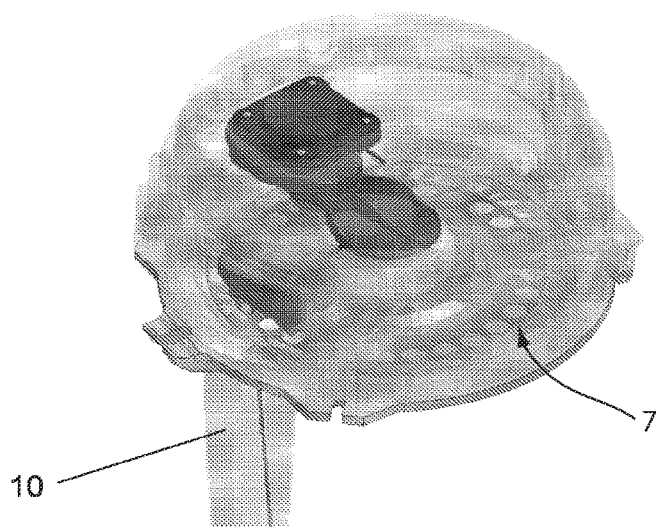
Fig. 2
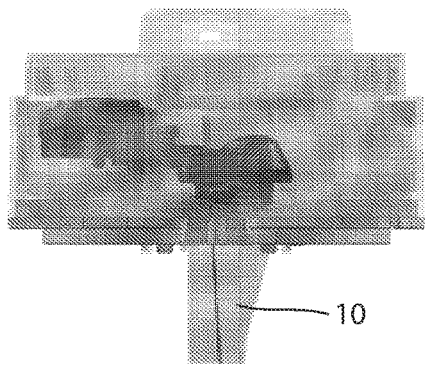 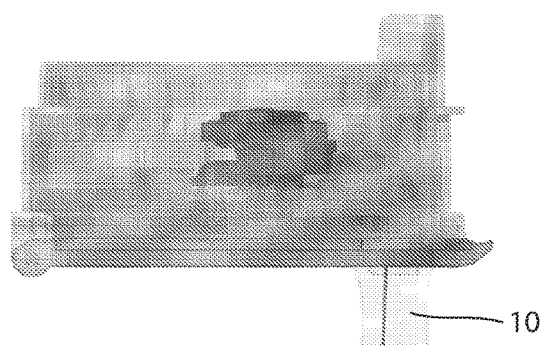
Fig. 3 Fig. 4

METHOD AND DEVICE FOR AVOIDING SEED-METERING ERRORS IN PLANTERS

CROSS-REFERENCE TO RELATED APPLICATIONS

This application is a national phase entry under 35 U.S.C. § 371 of International Patent Application PCT/BR2014/000384, filed Oct. 22, 2014, designating the United States of America and published as International Patent Publication WO 2015/058273 A1 on Apr. 30, 2015, which claims the benefit under Article 8 of the Patent Cooperation Treaty to Brazilian Patent Application Serial No. BR1020130273180, filed Oct. 23, 2013.

TECHNICAL FIELD

The instant disclosure relates to a process and respective device for avoiding seed-measuring errors in planters and seeders, hereinafter referred to as "planters," developed to provide an increase of efficiency of the planting process of agricultural seeds.

BACKGROUND OF THE INVENTION

It is well-known that the quality and efficiency of the planting process of grains strongly depend on the precision and uniformity of the seed-metering process, aiming to minimize population differences and the spacing between the plants.

The prior art contemplates planters with different types of seed meters and passage sensors, such as optical sensors, inter alia.

One of the prior art drawbacks lies in the presence of quite frequent errors due to the misuse of see meters, to the unsuitable choice of disks or incorrect calibrations associated with seeds to be planted, depending on product malfunctioning or even on the frequent obstruction in seed ducts.

In order to prevent these types of planting errors, several types of passage sensors have been used in the monitoring process of seed metering. It appears that, in most situations, these sensors are placed in the seed duct itself, being subject to all kind of exposure associated with the hostile agricultural environment such as mud, water, dust, vibration and mechanical shock, in addition to the difficulties and possible imprecisions in seed counting.

Another prior art drawback relates to the frequent need for constructive adjustments in the duct, compromising the efficiency of seed flow through the duct.

Furthermore, the need for data transmission and electricity implies the installation of extra wires and batteries that are also subject to hostile field conditions, requiring constant maintenance and making the installation of the monitoring system difficult.

BRIEF SUMMARY

In this seed-metering monitoring process a timely alert to the equipment operator is critical to allow the quick correction of the root cause associated with the planting error and resume, as soon as possible, the normal operation of the planter.

One of the objectives of the instant disclosure is that of providing a solution for the control of errors in the seed-metering process in planters, allowing the equipment operator to receive an automatic alert immediately at the time of the error, as well as allowing permanent monitoring of the quality of the planting process by means of a wireless data transmission system, powered by an autonomous central electric unit, eliminating the need for external batteries and power wires.

BRIEF DESCRIPTION OF THE DRAWINGS

Therefore, in order to better illustrate the subject matter in question, a detailed description thereof with reference to the figures below will follow, where:

FIG. 1 shows the details of the steps of the process for avoiding seed-metering errors in planters.

FIG. 2 shows a perspective view of the fully assembled metering-equipment, where its main components can be identified.

FIG. 3 shows a front view of the fully assembled metering-equipment, where its main components can be identified.

FIG. 4 shows a side view of the fully assembled metering-equipment, where its main components can be identified.

DETAILED DESCRIPTION

Figure 5:
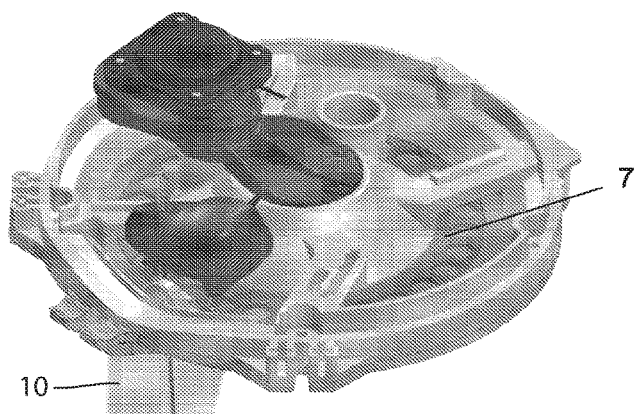
FIG. 5 shows a perspective view of the metering-equipment without its protective lid, where its main components can be identified.
Figure 6:
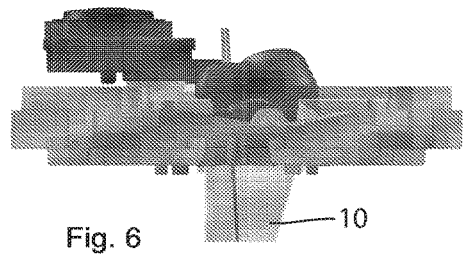
FIG. 6 shows a front view of the metering-equipment without its protective lid, where its main components can be identified.
Figure 7:
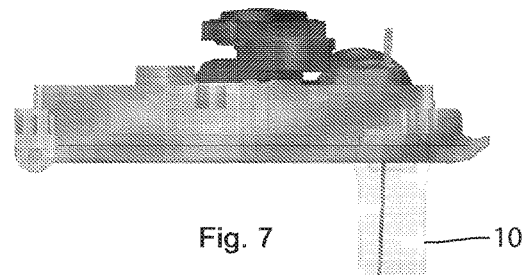
FIG. 7 shows a side view of the metering-equipment without its protective lid, where its main components can be identified.
Figure 8:
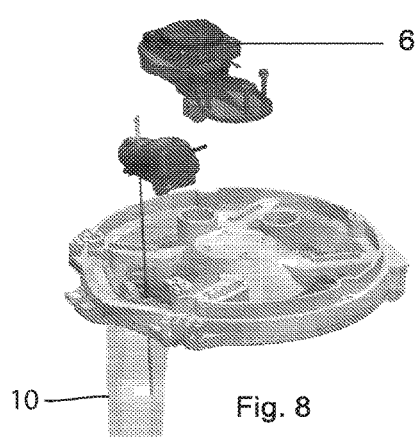
FIG. 8 shows an exploded view of the metering-equipment without its protective lid, where its main components can be identified.
Figure 9:
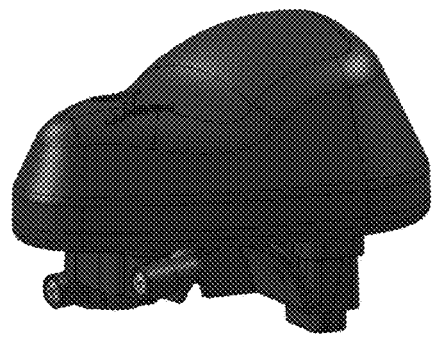
FIG. 9 shows a perspective view of the fully assembled set of sensors, where its final arrangement can be visualized.
Figure 10:
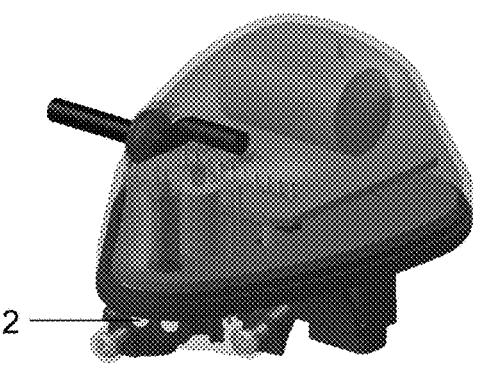
FIG. 10 shows a perspective view of the set of sensors with a transparent protective cover, where its main components can be identified.

According to the foregoing figures, the instant disclosure relates to an inspection equipment placed in a seed meter as shown in FIG. 2, capable of counting the dispensed seeds, detecting errors due to the absence of the seed in the holes of the distributing disk (7), detecting seeds stuck in the holes of the distributing disk (7) and detecting obstruction in the seed duct (10).

The inspection equipment consists of two proximity sensors placed before the seed (13) drops in the duct (10), a pre-sensor (1) and a post-sensor (2), which generate different analog voltage levels. These voltage levels that reach the electronic board (3) are digitized by analog/digital converters (3.2) and delivered to the processor (3.1) as numerical data.

The numerical data are analyzed by an algorithm contained in a firmware embedded in the processor. Following this analysis, the information is delivered by means of an RF transceiver (3.3) to a central unit (8) placed in an operator's vision field.

Figure 11:
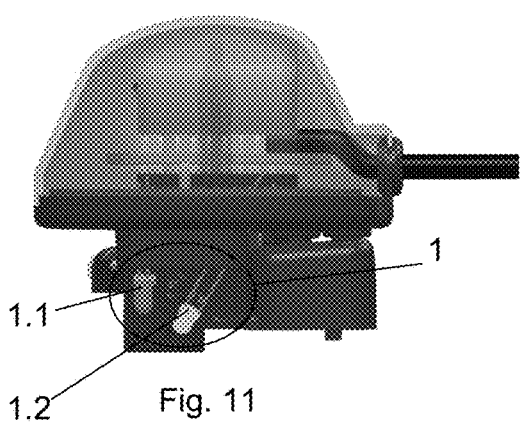
FIG. 11 shows a side view of the assemblage of the set of emitters and optical receivers, where the main components of the pre-sensor can be identified.

The pre-sensor (1) is a transducer whose output voltage is proportional to its distance from any protective screen. Thereby, it can be an optical emitter-receiver pair, an ultrasonic, or microwave, or capacitive proximity sensor or any other type of proximity sensor. The instant disclosure, as understood by FIG. 11, uses a narrow-beam infrared emitter (1.1) and an optical receiver (1.2) sensitive to the same wavelength. The receiver output voltage will be proportional to the light observed after being emitted by the emitter and reflected by a screen.

Figure 21:
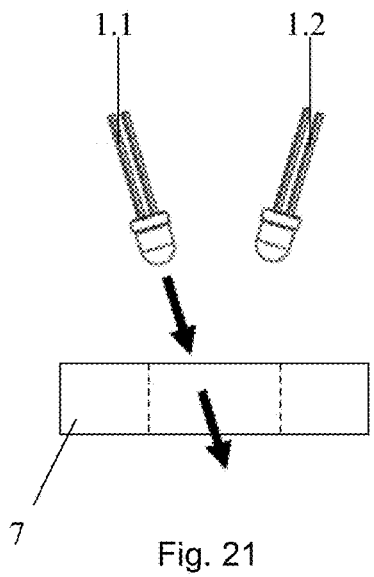
FIG. 21 shows a schematic side view of a set of pre-sensors, illustrating the functioning of the process for detecting seeds on the distributing disk, highlighting the absence of light reflection due to the absence of seeds on the disk.
Figure 22:
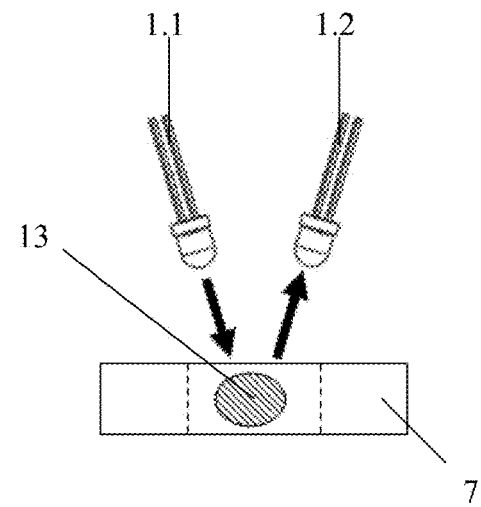
FIG. 22 shows a schematic side view of the set of pre-sensors, illustrating the functioning of the process for detecting seeds on the distributing disk, highlighting the occurrence of light reflection due to the presence of seeds on the disk.

Given that the sensor is placed before the seed dropping region, the output voltage level will behave quite differently depending on whether the disk hole contains a seed or not since when the seed is absent light reflection does not occur, as understood by FIG. 21; while, when the seed is present light is reflected at least slightly, as understood by FIG. 22. Therefore, seeds and errors can be detected and counted through the algorithm.

Figure 12:
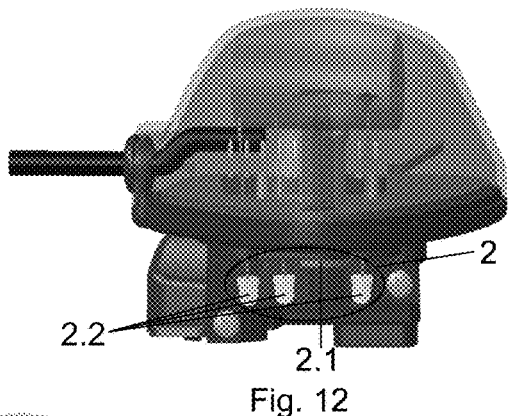
FIG. 12 shows a side view of the assemblage of the set of laser receivers and emitter, where the components of the post-sensor can be identified.
Figure 13:
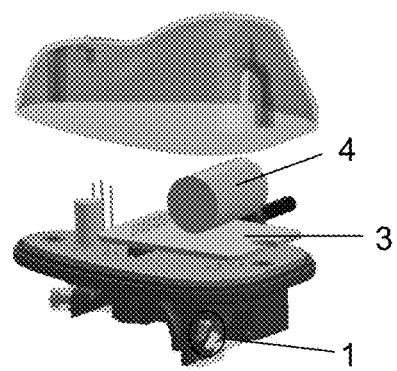
FIG. 13 shows an exploded view of the set of sensors without its protective lid, where its main components can be identified.
Figure 14:
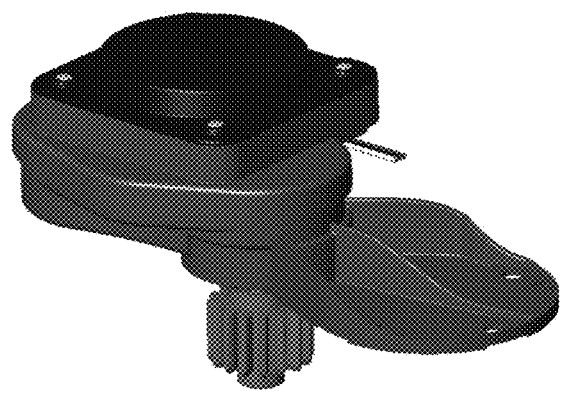
FIG. 14 shows a perspective view of the fully assembled set of sensors, where its final arrangement may be visualized.

The post-sensor (2) is a transducer similar to the pre-sensor (1), however it has a greater detection range. This greater range was obtained by replacing the narrow-beam infrared emitter by a more powerful collimated laser beam (2.1), as understood by FIG. 12. Furthermore, it has at least two optical receivers (2.2) to display enhanced sensitivity to reflected light and thereby enable the detection of a distant sensor screen. This sensor can be replaced or work together with ultrasonic or microwave sensors without losing the generality of the solution.

Figure 23:
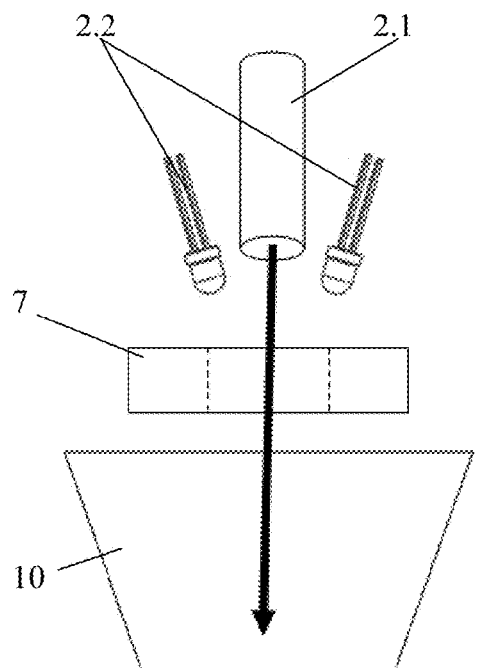
FIG. 23 shows a schematic side view of a set of post-sensors, illustrating the functioning of the process for detecting the obstruction in the seed duct, highlighting the absence of light reflection due to duct clearance.
Figure 24:
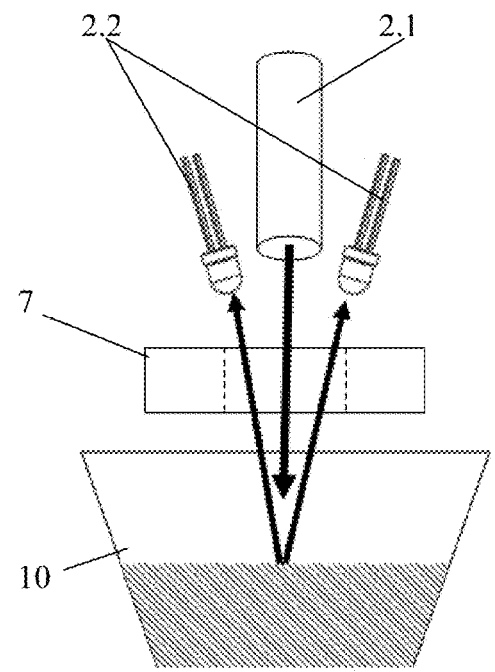
FIG. 24 shows a schematic side view of the set of post-sensors, illustrating the functioning of the process for detecting the obstruction in the seed duct, highlighting the occurrence of light reflection due to duct obstruction.

Such an optical arrangement makes possible to emit the light beam inside the seed duct, as shown in FIG. 23, and the presence of any screen will cause partial reflection of the incident light, captured by the receivers, as shown in FIG. 24, resulting in a change of the output voltage level thereof. Therefore, the algorithm can both count the seeds stuck in the seed meter and detect seed duct obstructions.

The constructive arrangement proposed and shown in the figures relates to the application of the equipment in conventional seed meters, where the seeds are dispensed by gravity. However, this very inspection equipment can also be installed in pneumatic see meters, by repositioning the pre-sensor upstream of the negative pressure region and by repositioning the post-sensor in the duct outlet to detect operational errors such as duct obstruction, absence or double distribution of seeds, or when more than one seed is distributed at a time.

Another object of the instant disclosure is the system supplying the electricity required for the operation of the sensors and the other electronic components of the equipment. This system consists of a generator (6), also referred to herein as a "dynamo," an electricity accumulator (4) and a regulated source of power (3.4).

Figure 15:
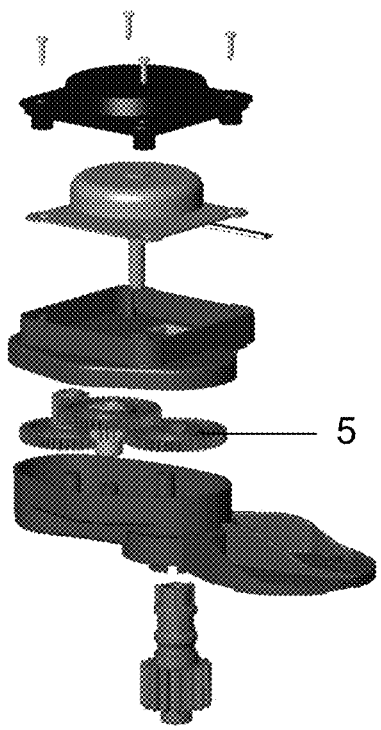
FIG. 15 shows an exploded view of the dynamo where its main components can be identified.
Figure 16:
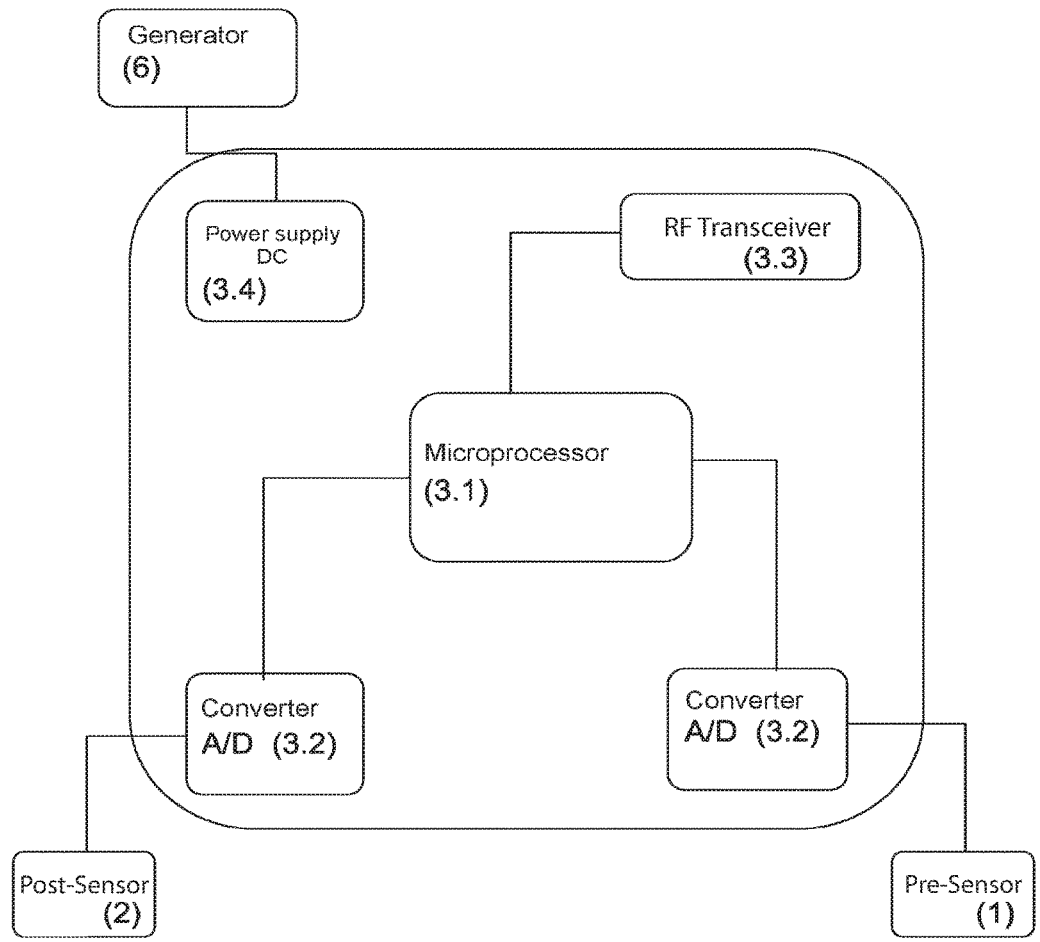
FIG. 16 shows the logic architecture of the sensing equipment.

The generator can be any transducer capable of capturing energy from the environment and transforming it into electricity. In this disclosure, a dynamo (6) is used that captures the rotational movement of the shaft of the seed meters by means of a set of gears (5), as shown in FIG. 15, that amplify its rotation, together with a photovoltaic panel capable of capturing energy from sunlight and turning it into electricity.

The accumulator is a device capable of storing electricity for long periods of time and providing it to the electronic board, wherein it can consist of an array of either researchable batteries or capacitors.

In the presence of sunlight, the photovoltaic panel produces electricity that is transmitted to the electronic board by means of electric wires. The same occurs with the dynamo upon rotation of the seed meters.

In the electronic board (3), the power supply regulates and stabilizes the voltage to charge the accumulator and supply the electronic circuits. If no energy is supplied by the generator set, the voltage accumulator directly supplies the circuits.

The communication between the equipment and the central unit (8) takes place by radiofrequency, that is, wirelessly. To this end, the electronic boards of the equipment and of the central unit (8) are provided with RF transceiver (3.3), namely, electronic devices that receive data packets and send information via electromagnetic waves at a demodulation of received electromagnetic waves and the corresponding extraction of data packets.

In the instant disclosure communication is half-duplex (emitter and receiver alternate in the channel), ensuring packet delivery, power of 0 dBm in data transmission and −94 dBm in data reception. Frequency modulation is of the GFSK-type (Gaussian frequency-shift keying), has a communication speed of 250 kbps, and a theoretical range up to 100 m in the open space.

The modulation base frequency is 2.4 GHz, suitable for transmissions of this nature to provide more robustness to noise.

In order to avoid interference between different networks, a process has been developed to determine the transmission frequency according to the physical address of each central monitoring unit. Thereby, for each one of the networks consisting of one central unit with several pieces of inspection equipment, the transmission frequency increases by 10

MHz, according to the address of the respective central unit. For instance, in network 1 the central unit address is 1 and the modulation frequency is 2.41 GHz (2.4 GHz+10 MHz), while in network 2 the modulation frequency is 2.42 GHz (2.4 GHz+20 MHz), and so on.

Thereby, two different networks, for instance, two planters, can operate in the same space without interference between the two equipment networks.

To ensure the quality of data transmission between the equipment and the central unit (8), an algorithm was included for a consistency test and the respective transmission of a confirmation signal from the central unit (8) to the equipment—

Upon arrival at the central unit, the packets are handled serially and several actions are triggered therefrom. Any delay in this process may involve loss of a subsequent packet, for instance, sent by another device, decreasing network efficiency.

In order to obtain a highly efficient network, a row management system that optimizes the package receipt was developed.

The central unit has six input data rows, where each row has three FIFO (First-In-First-Out) packet buffers, implemented in a star topology (1 central unit for 6 equipment families).

Figure 17:
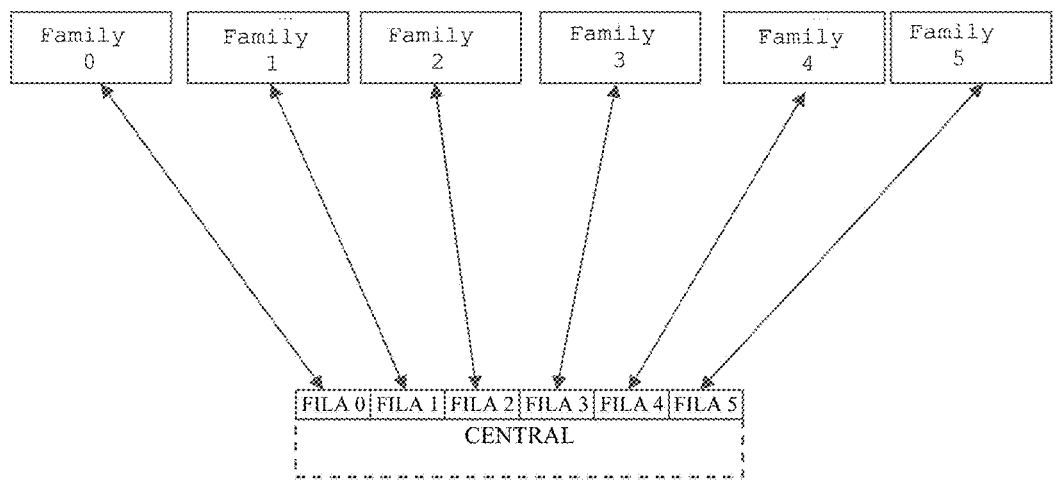
FIG. 17 shows the topology of a network of equipment and the respective data rows.
Figure 18:
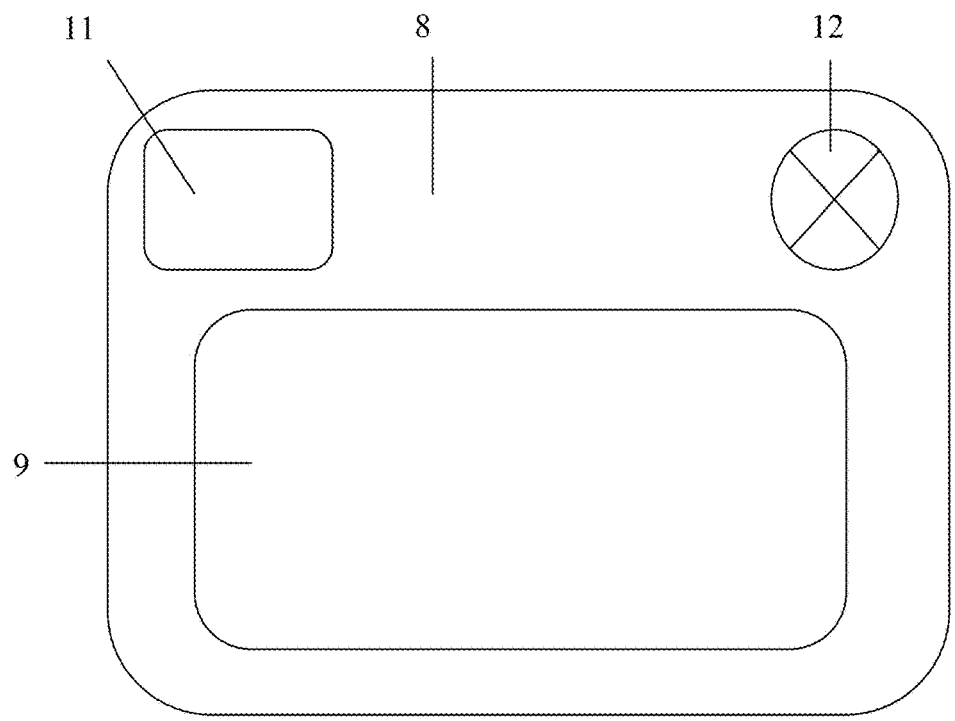
FIG. 18 shows the logic architecture of the operator's monitoring unit.
Figure 19:
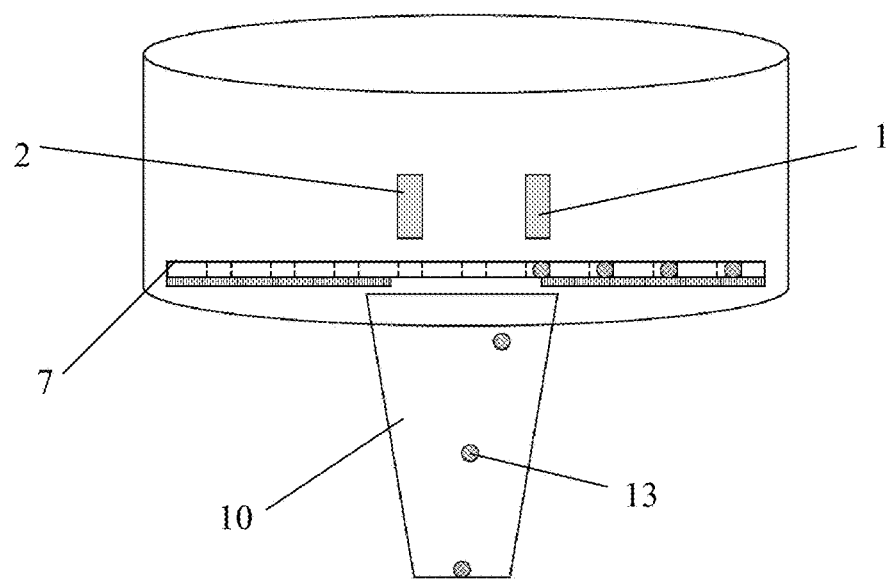
FIG. 19 shows a schematic front view of the set comprised by the distributing disk and the seed duct, where the sensors are placed before (pre-sensors) and after (post-sensors) seed drop.
Figure 20:
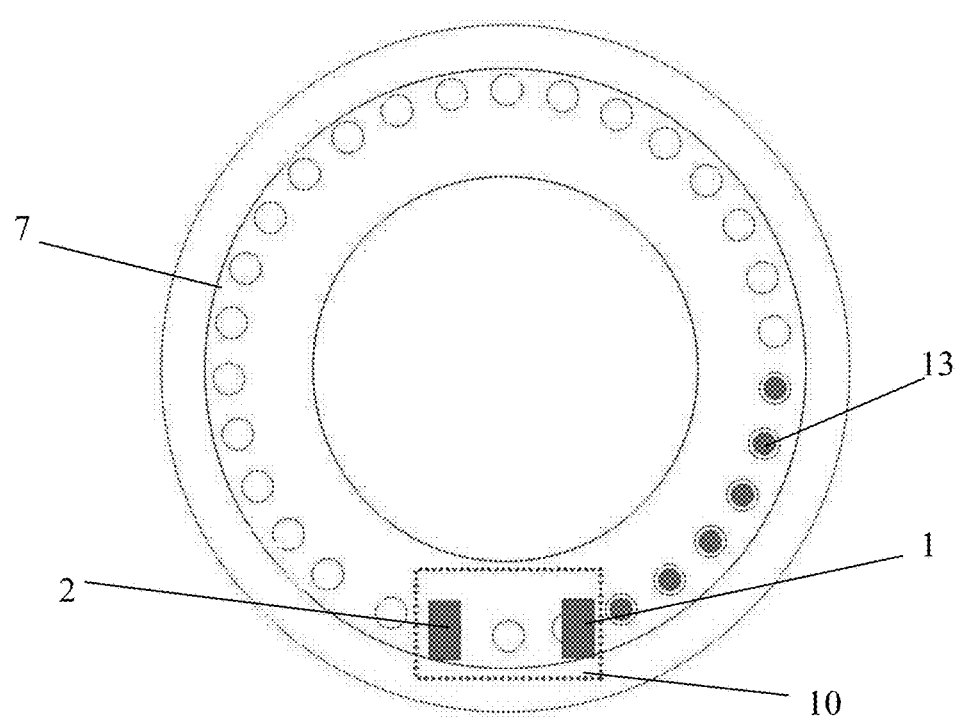
FIG. 20 shows a schematic top view of the set comprised by the distributing disk and the seed duct, where the sensors are placed before (pre-sensors) and after (post-sensors) seed drop.

The pieces of equipment are evenly distributed in the rows of their physical address, as shown in FIG. 17.

The number of a row depends on the physical address of the respective equipment, according to the following algorithm:

Row Number=Physical Address MODULE 6

Therefore, the row number is determined by the rest of the division of the physical address by six. For instance, if the physical address of the equipment corresponds to number 32, the row of the respective equipment will be equivalent to number 2, corresponding to the rest of the division of 32 by 6.

In the event of a critical situation, for instance, the obstruction of the duct, an alert signal is immediately sent to the central unit by the equipment processor by means of the RF transceiver. The central unit (8) receives the signal with the information and displays a warning to the operator via Graphical User Interface (GUI) (9), triggering an audible alarm through the loud-speaker (12).

Furthermore, within regular time intervals, the equipment processor transmits to the central monitoring unit some non-critical information, such as the number of distributed seeds as well as the errors detected in a given time interval. The central unit crosses this information with the time and geographical position data provided by a Global Positioning System (GPS) (11), displaying the results in its GUI (9).

In some cases the equipment can infer that the seed see meter is not in use, as in the absence of a response during a communication with the central unit or when the electronic board is not powered by the generator for long periods of time, meaning that the seed meter is not being driven and, thus, there is the need for inspection by the sensor.

In these cases, the equipment can perform energy saving functions, such as a shutdown of the sensors and A/D converters as well as a decrease of the processor clock, providing a reduction of energy consumption.

The invention claimed is:

1. A process for avoiding seed-metering errors in planters, wherein the process comprises:

generating electric power in a seed meter by means of a dynamo;

monitoring seed loading directly in a seed distribution disk by means of a pre-sensor;

monitoring clogging of the seeds in the seed distribution disk by means of a post-sensor;

monitoring obstructions in a seed duct by means of a post-sensor;

detecting a voltage of analog signals generated by means of a pre-sensor and post-sensor;

converting the analog signals into digital signals using analog/digital converters;

processing the digital signals on a processor; and transmitting the processed digital signals to a central monitoring unit by means of an RF transceiver.

2. A process for avoiding seed-metering errors in planters, according to claim 1, wherein the process uses a star network topology having a different data transmission frequency for each network of the star network topology that includes a central monitoring unit.

3. A process for avoiding seed-metering errors in planters, according to claim 2, wherein the process further uses a rows system, containing 3 buffers for each row, the row number being determined based on the physical address of the respective monitored equipment.

4. A process for avoiding seed-metering errors in planters, according to claim 1, wherein the process is applied in a pneumatic seed meter.

5. A device for avoiding seed-metering errors in planters, wherein the device is disposed into a seed meter of a planter, the device comprising:

a pre-sensor;

a post-sensor;

a dynamo connected to a shaft of the seed meter that captures the rotational movement of the shaft by means of a set of gears;

an electricity accumulator; and an electronic board having a signal processor, analog/digital converters, and an RF transceiver;

wherein the pre-sensor and post-sensor are disposed close to a seed distribution disk.

6. A device for avoiding seed-metering errors in planters, according to claim 5, wherein the pre-sensor is of the type having a narrow-beam infrared emitter and an optical receiver and the post-sensor is of the type having a collimated laser beam emitter and at least two optical receivers or any one of the pre-sensor and post-sensor are sensors selected from the group consisting of ultrasonic sensor, microwave sensor, capacitive sensor, or proximity sensor.

7. A device for avoiding seed-metering errors in planters, according to claim 5, wherein the dynamo is configured for use together with a photovoltaic panel.

8. A device for avoiding seed-metering errors in planters, according to claim 5, wherein the device is configured for use in a pneumatic seed meter by repositioning the pre-sensor upstream of a negative pressure region and by repositioning the post-sensor in a duct outlet of the seed meter.

9. The device of claim 5, wherein the pre-sensor comprises a narrow-beam infrared emitter and an optical receiver and the post-sensor comprises a collimated laser beam emitter and a least two optical receivers.

* * * * *